United States Patent [19]

Hsiang

[11] Patent Number: 5,522,087
[45] Date of Patent: May 28, 1996

[54] SYSTEM FOR SELECTIVELY OPERATING IN DIFFERENT MODES DEPENDING UPON RECEIVING SIGNAL FROM A HOST COMPUTER WITHIN A TIME WINDOW UPON POWER UP

[75] Inventor: Chih-Chiang Hsiang, Cupertino, Calif.

[73] Assignee: Verifone Inc., Redwood City, Calif.

[21] Appl. No.: 215,894

[22] Filed: Mar. 22, 1994

[51] Int. Cl.$^6$ ............................ G06F 13/00; G06F 15/02
[52] U.S. Cl. .................... 395/838; 395/285; 395/494; 395/865; 371/62; 364/240.9; 364/251.4; 364/940.1; 364/940.81; 364/187
[58] Field of Search .................. 395/275, 838, 395/285, 494, 865; 364/550, 119, 187; 371/62

[56] References Cited

U.S. PATENT DOCUMENTS

| | | | |
|---|---|---|---|
| 4,093,998 | 6/1978 | Miller | 364/900 |
| 4,276,593 | 6/1981 | Hansen | 364/119 |
| 4,322,793 | 3/1982 | Andersson et al. | 364/200 |
| 4,407,016 | 9/1983 | Bayliss et al. | 364/200 |
| 4,670,838 | 6/1987 | Kawata | 364/200 |
| 4,694,408 | 9/1987 | Zaleski | 364/551 |
| 4,785,393 | 11/1988 | Chu et al. | 364/200 |
| 4,868,735 | 9/1989 | Moller et al. | 364/200 |
| 5,058,056 | 10/1991 | Hammer et al. | 364/900 |

*Primary Examiner*—Thomas C. Lee
*Assistant Examiner*—Po Huang
*Attorney, Agent, or Firm*—Lowell C. Bergstedt

[57] ABSTRACT

A method for operating a local device to permit a host computer to assert control over the local device via a communication port. A control available time window of prearranged duration is set up in the local device in response to a power on start condition. During this control available time window an Assert Control signal is received from the host computer. An Acknowledge Control signal is sent to the host computer upon receipt of the Assert Control signal during the control available time window. Then the local device responds to any control commands and data received from the host computer. Finally, the local device initiates processing of a normal local device application processes when no Assert Control signal is received during the control available time window or after the host computer has finished sending control commands and data to the local device.

7 Claims, 5 Drawing Sheets

SYSTEM FOR SELECTIVELY OPERATING IN DIFFERENT MODES DEPENDING UPON RECEIVING SIGNAL FROM A HOST COMPUTER WITHIN A TIME WINDOW UPON POWER UP

FIELD OF THE INVENTION

This invention relates generally to apparatus and methods for asserting control of a microprocessor based local device by a host computer.

BACKGROUND AND PRIOR ART

It is well known in the prior art for a host computer to assert control of a local microprocessor device for downloading of application program or configuration control data. Generally, if the local device has a keyboard or includes a program switch setting, either a specific program switch is set or a prearranged coincident press of plural keys during power up of the device is used to signal the local device to enter a host control mode. Thereafter the local device will accept control signals and data from a host computer via a communication channel connecting the two systems.

FIG. 1 illustrates a prior art system in which a host computer 5 is coupled via a data communication bus or channel 6 with a local device 8 which has a microprocessor board 8 (or microcontroller). In this case a set of switches 9 is provided and one of these switches would be devoted the host control mode and be set on to enter that mode. Then when the host control operation is completed, the switch would be returned to the off position to resume normal operation of the local device.

Some local devices such as the check reader 10 shown in FIG. 2 do not require switches or keyboards in their normal operation and including one of them for the sole purpose of achieving host control is an unattractive cost addition. If a switch were utilized in such a device for this purpose, it would usually be hidden under the case of the device to avoid inadvertant change of operation mode from normal operation to host control mode of operation. Thus, the case must be removed or a window in the case provided to gain access to the switch to change the mode.

OBJECTS OF THIS INVENTION

It is the principal object of this invention to provide improved apparatus and methods for establishing a host control mode of operation of a local microprocessor device.

It is an object of this invention to provide a host control mode without the use of any switches or keys.

FEATURES AND ADVANTAGES OF THIS INVENTION

One aspect of this invention features a method for operating a local device to permit a host computer to assert control over the local device via a communication port. An important step of the method is setting up in the local device a control available time window of prearranged duration in response to a power on start condition. During this control available time window, the local device is ready to and may receive an Assert Control signal from the host computer. The method further includes transmitting an Acknowledge Control signal to the host computer upon receipt of the Assert Control signal during the control available time window. Finally, the method involves responding to any control commands and data received from the host computer after sending of the Acknowledge Control signal and initiating the processing of a normal local device application process when no Assert Control signal is received during the control available time window or after the host computer has finished sending control commands and data to the local unit.

Another aspect of this invention features a system for temporarily controlling a local device from a host computer via a data communication channel between a port on the host computer and a port on the local device. The host computer includes a sending means for repeatedly sending over the data communication channel to the local device a prearranged Assert Control message. The host also includes detecting means active after sending each of the Assert Control messages for detecting a prearranged Acknowledge Control message from the local device and a control means active upon receipt of the Acknowledge Control message from the local device to send prearranged control and data signals to the local device.

In the system of this invention, the local device includes window setting means responding to the establishing of a Power On condition for setting a Control Window period of a prearranged duration. A control detecting means in the local device is exclusively active during the Control Window period for receiving and verifying an Assert Control message from the host computer. The local device further includes control acknowledging means responsive to the control detecting means to send an Acknowledge Control message to the host computer via the data communication channel. In addition, a control response means in the local device responds to control signals from said host computer after the Acknowledge Control message has been sent. Application starting means in the local device is responsive to expiration of the Control Window period to initiate normal application operation of the local device.

As both an apparatus feature and a method feature, the use in this invention of a passive 'control available' time window in the local device at each power on avoids the need for any switches or keys to be provided for setting a host control mode. All the host computer has to do is to repeatedly transmit an Assert Control signal to the local device so that the signal will be received within the 'control available' time window. The passive nature of this time window prevents it from interfering with normal operation of the local device and its communication with the apparatus to which it would be connected when in normal operation.

For example, if the local device is a stand alone check reader which is in data communication with an electronic cash register, the passive time window does not interfere with the data flow or confuse the ECR because no signals are being sent out during the passive window. In other words, the local device is simply passively waiting to determine if it is on a communication link with a host computer that is ready to assert control during the passive time window.

Further, using the system and method of this invention, there is no possibility that the local device may be inadvertently left in a host control mode and thus not be ready to properly function within the overall system as could happen with use of an internal switch to set the mode. The passive window expires a short time after power up and the unit enters its normal operating mode before the operator would be able to sense a delay.

Other object, features and advantages of this invention will be apparent from a consideration of the detailed description below in conjunction with the accompanying drawings.

BRIEF DESCRIPTION OF DRAWING FIGURES

DESCRIPTION OF PREFERRED EMBODIMENTS

Figure 1:
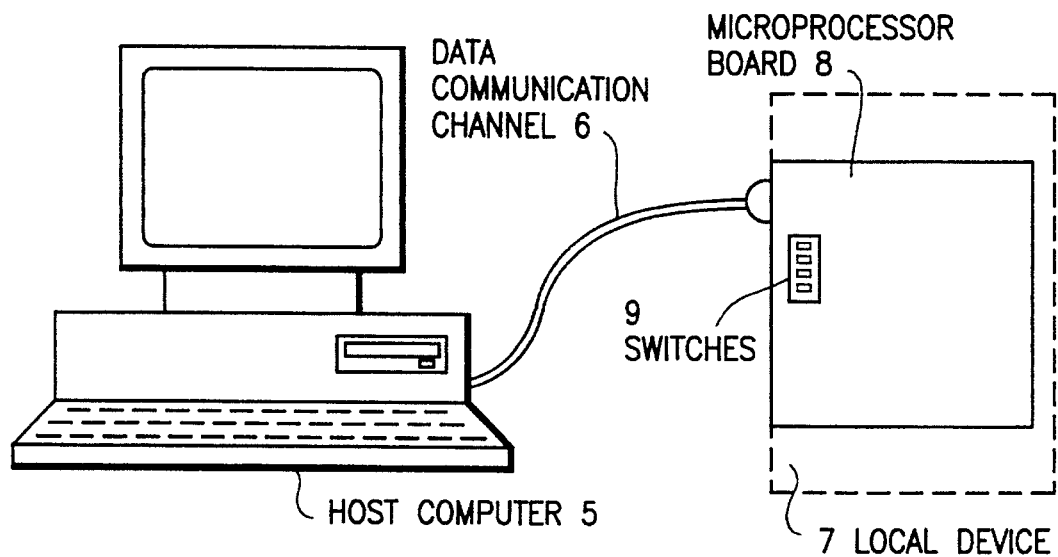
FIG. 1 is a illustration of prior art apparatus and associated methods for arranging a host control mode.
Figure 2:
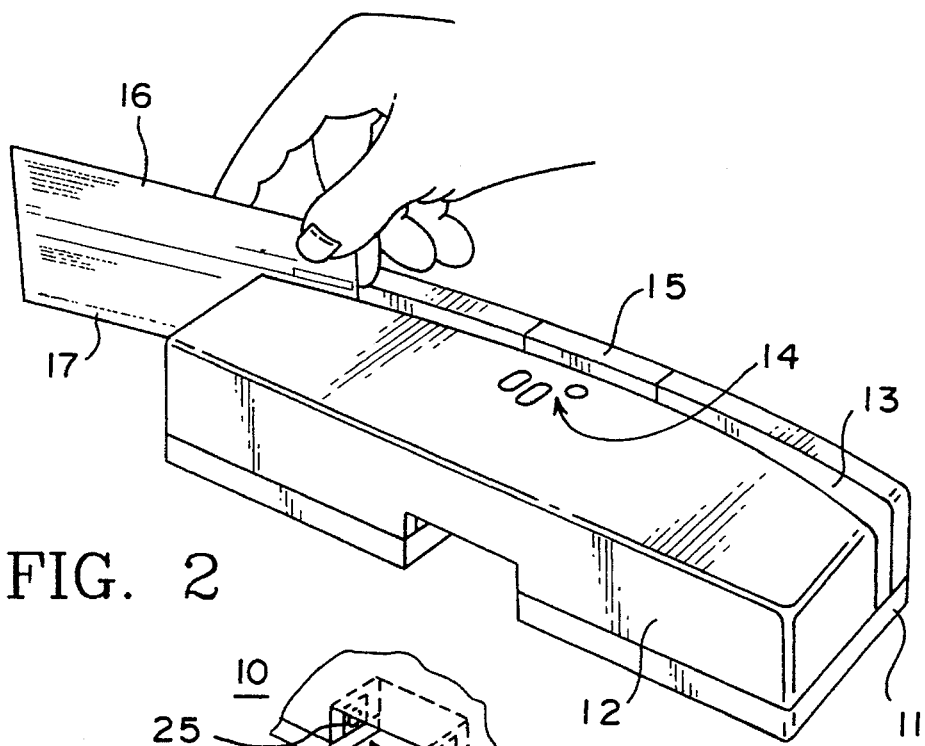
FIG. 2 is a drawing showing a local device in the form of a check reader in which the apparatus and method of this invention are utilized.

FIG. 2 illustrates a type of local device which requires no keys or switches in its normal operation. Check reader 10 is used to read a check 16, or more specifically, the MICR line 17 printed on check 16. Check 16 is swiped through slot 13 formed in top casing 12 which forms with base 11 a housing for the internal working components of check reader 10. A set of signal lights 14 are provided to signal the operator that the reader is ready, and whether the check was read successfully or with an error. A fold down hinged door structure 15 provides access to the optical window for cleaning.

Figure 3:
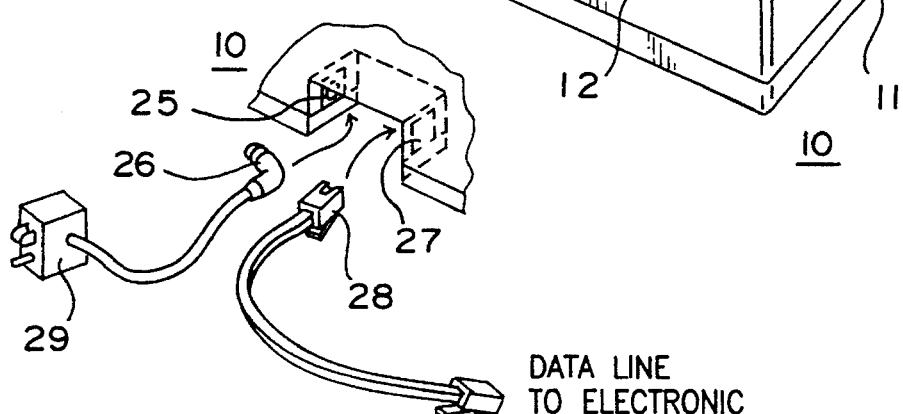
FIG. 3 illustrates in greater detail a portion of the check reader of FIG. 2.

While the details of structure and operation of the check reader shown in FIGS. 2 and 3 are not part of this invention, certain aspects thereof are set forth in co-pending and commonly assigned U.S. patent application Ser. No. 08/027,344, filed on Mar. 8, 1993, and entitled: MANUAL CHECK READER APPARATUS WITH OPTICAL IMAGING, (now U.S. Pat. No. 5,345,090). This application is hereby incorporated by reference to further illustrate the type of apparatus into which the features of this invention might be incorporated.

As shown in FIG. 3, a power cord 26 is inserted into a power receptacle 25 to provide electrical power to the reader 10 from a converter 29 that plugs into a wall socket. A data line 28 in the form of a telephone type cable plugs into a phone jack type of socket 27 and communicates data signals to an external device such as an electronic cash register or other point of sale device. It should be noted that no on-off switch is provided and no keys or external switches are used on this local device. Power is applied to the check reader device when the power cord 26 is inserted and this furnishes the power on signal to the microprocessor in the check reader device.

Figure 4:
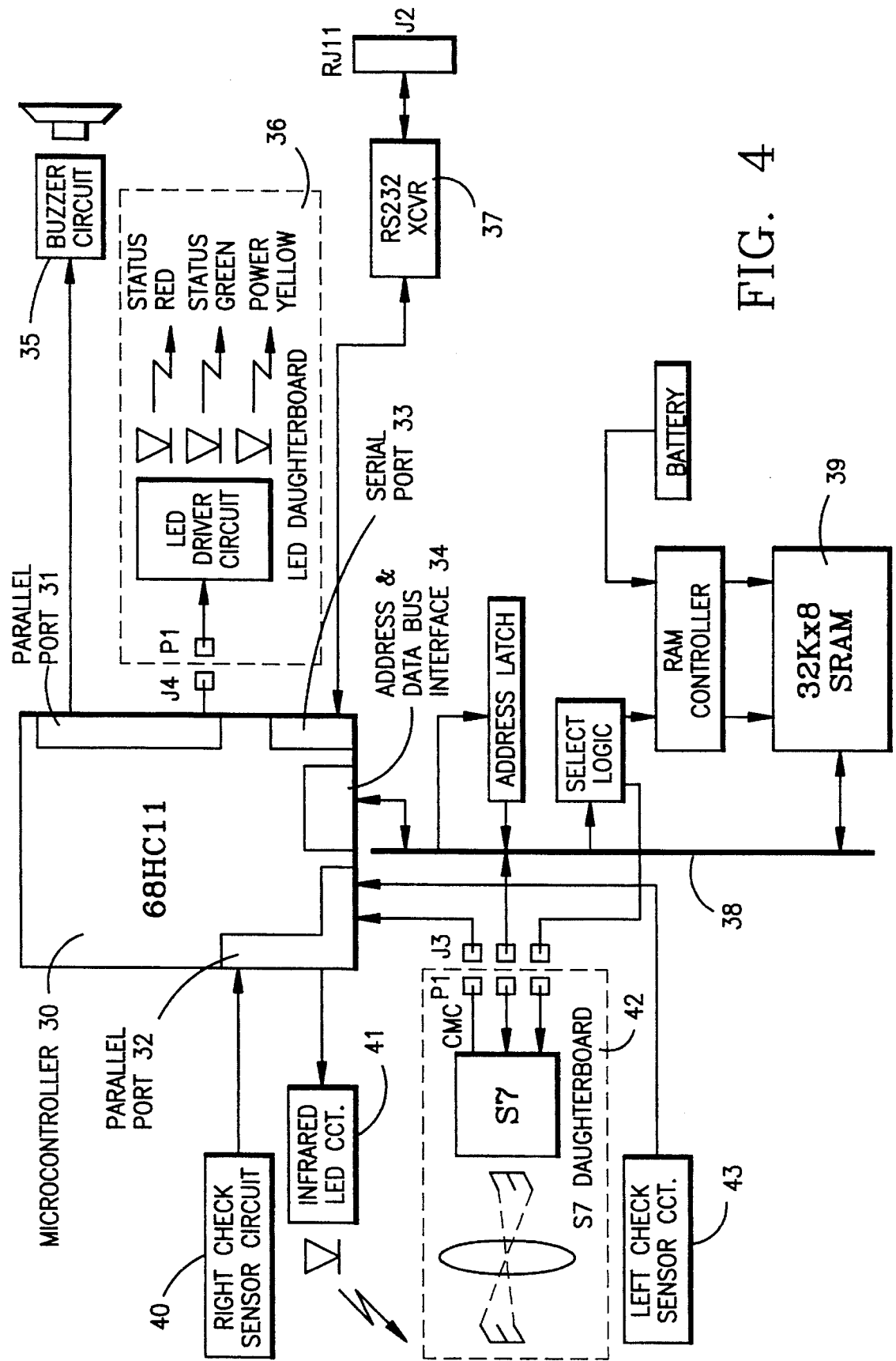
FIG. 4 is a block schematic diagram of the electronic hardware of the check reader of FIG. 2.

FIG. 4 shows the electronic system components of check reader 10. A microcontroller, in this case a Motorola 68HC11 part, communicates via parallel ports 31 and 32 with buzzer 35, an LED signaling arrangement 36, optical check reading components 42, right and left check presence sensors 40,43, and an infrared LED check illumination arrangement 41. Serial port 33 provides two way data communication via transceiver 37 to an external device which may be a host computer wanting to assert control of the check reader or another device, such as an ECR, which is to receive check reader data from this unit during normal operation.

Address and data bus interface 34 communicates in standard fashion with the optical check reader subsystem 41 and memory 39. Microcontroller 30 has internal ROM and RAM memory. These memory components provide storage for the operating system firmware of the device and for data and control messages of various types.

In accordance with this invention, microcontroller 30 in check reader 10 is programmed to permit a host computer to assert control of this local device over the serial communication channel for one or both of diagnostic and program download purposes. To achieve this without switches, the power on routine in the firmware programming of the device includes a time window protocol which runs automatically on each power up cycle to permit a host computer to gain control of the device at that time if it is prepared to do so.

In general, this assertion of control is implemented by the host computer repeatedly sending to the check reader a prearranged assert control message. When the check reader reaches the time window protocol portion of its power on routine, it receives, recognizes, and acknowledges this assert control message from the host and then executes whatever diagnostic or other directives are received from the host computer in subsequent control message communications.

Figure 5:
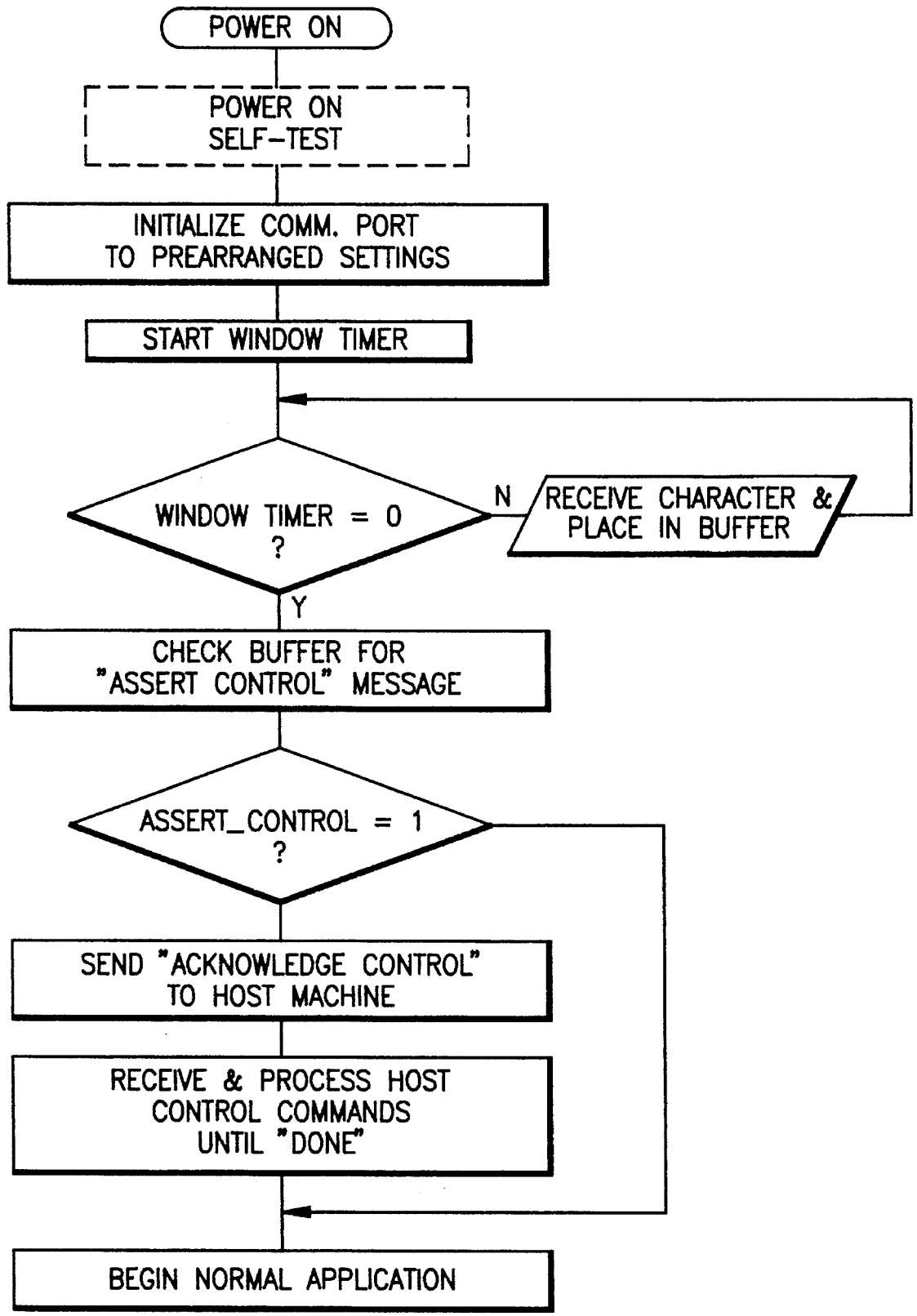
FIGS. 5–7 are software flow diagrams illustrating aspect of the method and apparatus of this invention.

FIG. 5 illustrates a general approach to programming a local device to implement this time window-assert control protocol as part of a power on routine. This approach assumes that the assert control message will consist of 'x' characters or bytes, for example two characters, which must be precisely the 'assert control' message expected to be received from the host. However, noise generated characters may also be present. Thus, the routine stores a sequence of received characters and then looks to see if the 'assert control' message is present in the stored sequence.

As shown in FIG. 5, the local device may first execute some power on self test routines and only enter the time window protocol if these tests are successfully completed. This is an optional part of the power on routine. Following any such self test routines, the communications port (comm port) is initialized to prearranged settings for communication with a host computer. Then, a window timer is started. As is well known in the art, this may be a count down or count up timer function with incrementing or decrementing done by the system time clock. In this case we are assuming a count down timer function. The next step in the routine is to check to see if the window timer is equal to 0, i.e. if the time window during which the host machine may assert control has closed. If this checking step returns N0, then a character is received and placed in a buffer and this loop is executed until the time window expires. When this checking step returns YES, the buffer is checked for presence of an 'Assert Control' message and an Assert_Control flag is set to ONE if the message is present.

Next, the status of this assert_control flag is checked. If NO is returned, normal application processing is started. If a YES, is returned, an "Acknowledge Control" message is transmitted to the host computer and host control commands are received and executed until "Done". Then normal application routines are executed.

This routine is based on storing all characters received during the preset time window. An alternative would be to store only a preset number of characters, i.e. a number sufficient to include the Assert Control characters after some initial noise characters. Then the stored characters would be checked to see if the "Assert Control" character sequence is present. For example, if the "Assert Control" message were two characters "AB" and the Power On routine stores ten characters: #$ @BABABA, the first four characters are noise, but the "AB" message is found in the remaining characters when the buffer is checked.

Figure 7:
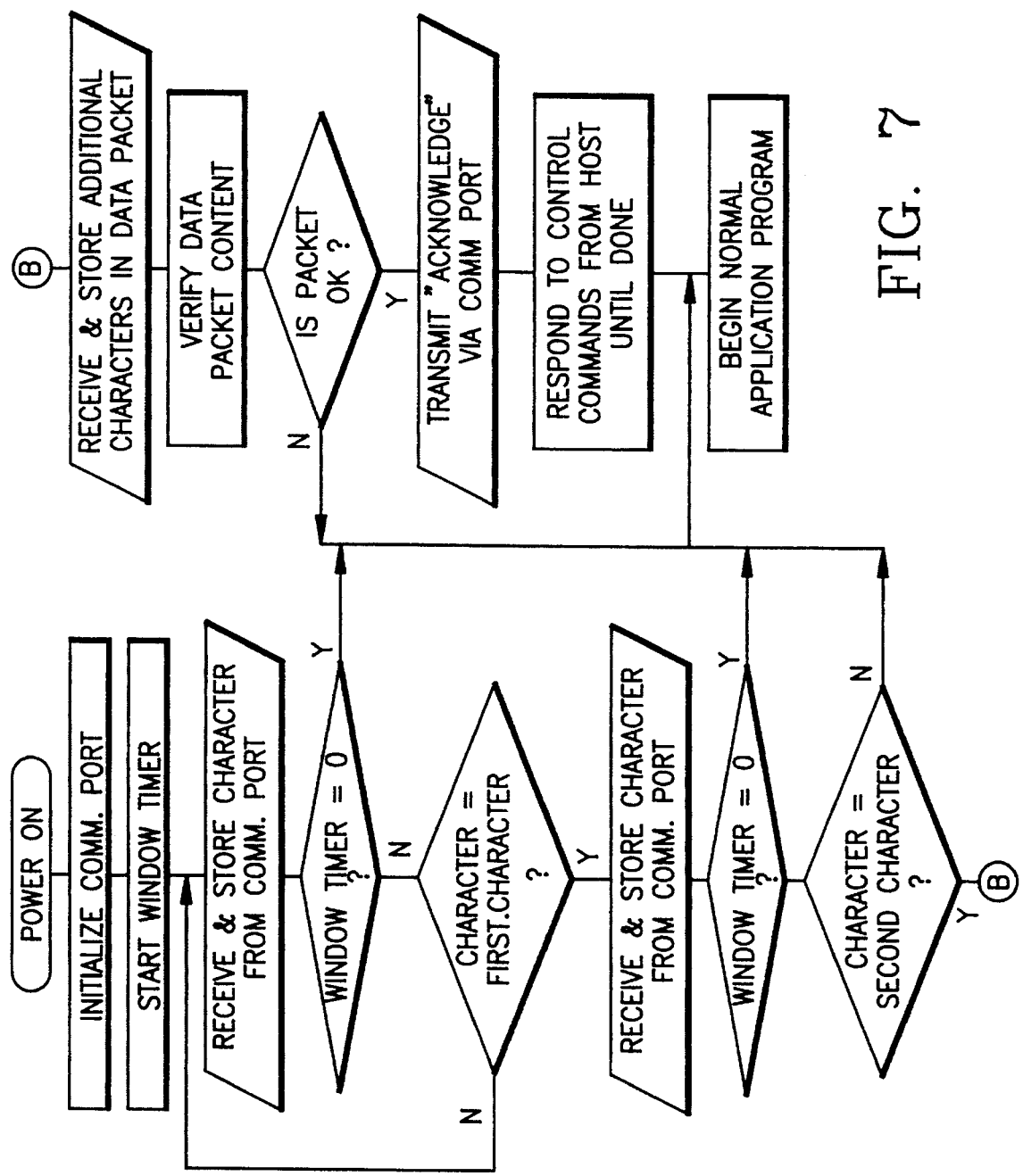

FIG. 7 below shows the alternative approach of receiving and checking each character as it comes in to see if it matches with the corresponding "Assert Control" character expected at that time. This will be discussed below. It should be understood that a number of different routines could be used to determine if there is a host computer sending an assert control message to the local device during the time window. For example, another approach might involve accepting and storing an entire message packet as long as the first character is received during the time window set in the power up routine, followed by checking to see if some prearranged aspect of that message packet matches the prearranged assert control message.

Figure 6:
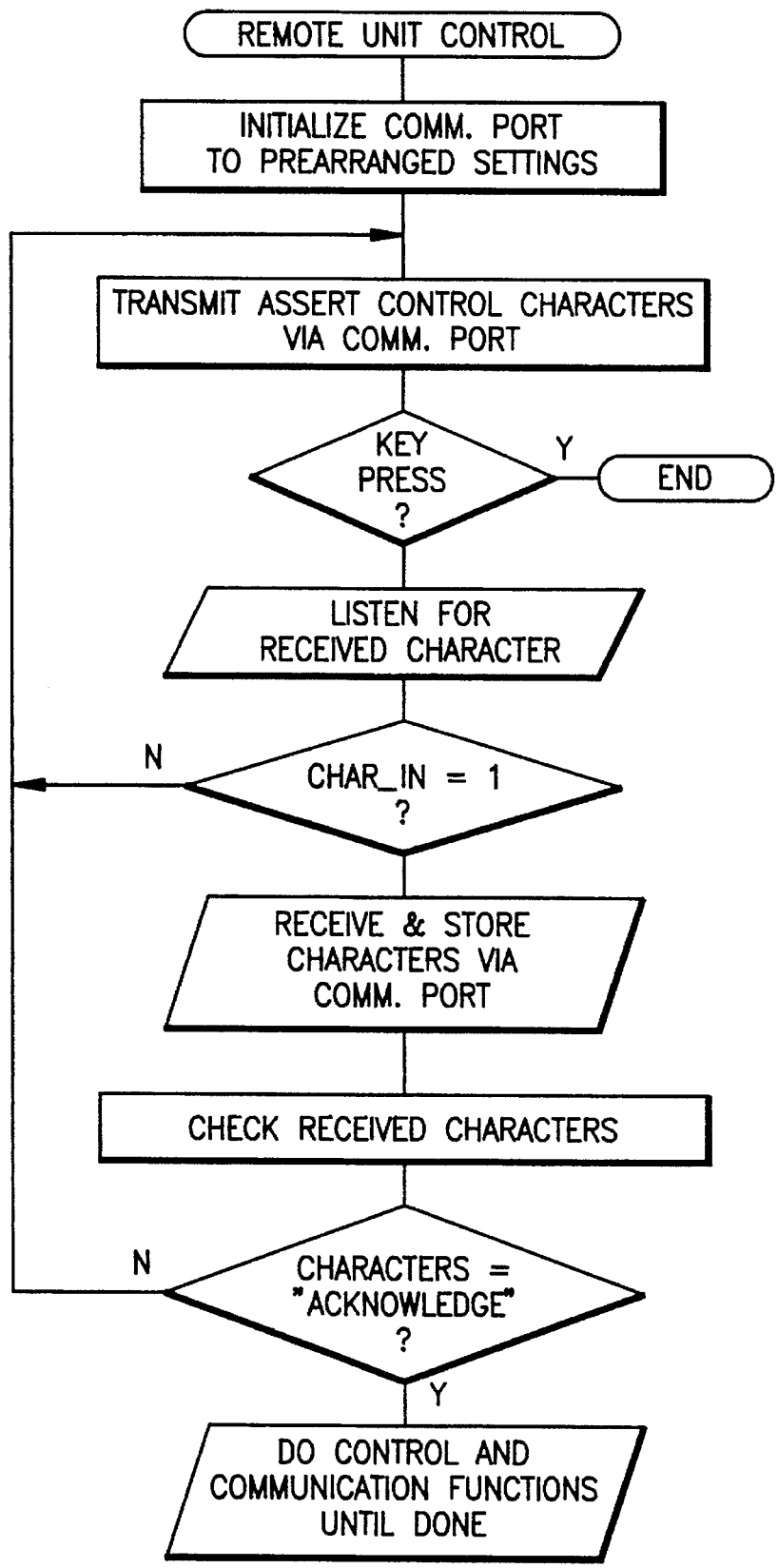

FIG. 6 illustrates a host side control routine or remote unit control routine that goes along with the local device power on (time window) routine of FIG. 5 or the alternative local device routine of FIG. 7. In this routine, the comm port of the host device is initialized to prearranged setting and then assert control characters are transmitted followed by a listening for a response and a retransmission if no response unless a key press is detected to stop the routine. When a first received character is detected, the expected number of characters in a control acknowledge message from the local device are received, stored and checked to see if they match the prearranged acknowledge message. If not, the routine resumes sending the assert control characters until it is stopped manually or the acknowledge message is received. Once the acknowledge message is received, the host performs the scheduled control and communication functions until it is done.

As shown in FIG. 7, the power on routine in the local device such as check reader 10, may receive, store and check each character as it comes in. Only if the first expected assert control character is received before the time window is expired will the routine continue with receiving and checking for receipt of the second expected assert control character during the open time window. If the two assert control characters are received in the time window, then the entire data packet is received and stored and verified as to content and accuracy of receipt (e.g. parity or crc byte checking). If the packet is verified, the acknowledge message is sent to the host computer and control commands from the host are executed until done.

To further illustrate a working example of this invention in the form of the ONYX (tm) check reader product shown in FIGS. 2 and 3, the following discussion of this specific implementation is provided.

Power-On Self Test and Time-Window

The Onyx software supports some diagnostic and general purpose service functions that is built-in inside the ROM. It consists of the Power-On Self Test (POST), which is performed every time the unit is powered-up, as well as other system level functions that can be invoked through software directives over the serial port.

Power-On Self Test

Every time the Onyx powers on, the following steps are checked regardless of what configuration or software is in the non-volatile memory.
1. Tri-State test—Port A bit 2 input is tested. This bit is normally pulled high with a pull-up resister. But if this bit were forced low externally, the POST will stop and the status LED will blink a prearranged pattern. This mechanism allows the Onyx data and address bus be tri-stated so that automated hardware testing on the circuit board may be performed without physically having to remove the microcontroller from the bus.
2. LED test—All status LEDs are on so that the user may verify the LEDs are functional. The LED will remain on throughout the POST.
3. ROM test—The ROM memory word check-sum is calculated for the entire ROM and then it is compared with the known check-sum. If the check-sum is incorrect, the POST will stop and the red status LED will blink the error message pattern.
4. RAM test—The RAM chip is enabled slightly after the main controller is running. This test will repeat writing a word pattern to the RAM until the RAM is ready. If after 65535 retries and the RAM is still not ready then the POST will terminate and the LED will blink the RAM error message pattern.
5. Time-Window—At this time the Onyx will look for a system directive from the serial port and enter the diagnostic mode if the correct directive is received within the 0.5 second time window.
6. File test—Onyx checks for the download code file using the file information given in the download code prefix region. A two-byte check-sum is computed for the given file size and is then compared against the known check-sum.
7. Control transfer—If it passes all steps above, the system jumps to the start of the downloaded code.

Time-Window and System Directives

For 0.5 seconds during powering up, the unit may be placed into a host control mode for diagnostic or application download purposes if a proper system directive is sent to the unit through the serial port. The directive has a unique pattern and contains a 2-byte CRC check. If the correct assert control directive is received within the 0.5 second window, the Onyx enters the diagnostic-download mode. It will remain in this mode until either an exit directive is given by the host, or when the unit is powered off. The status LEDs will both go off upon entering this mode.

The comm port line setting are 19200 baud, 8N1

All directives follow this message format:

<FF><55><count><data><crc1><crc2>
where <FF><55> = two bytes: FF hex and 55 hex.
where <count> = size of the directive packet.
<data> = the directive with or without other parameters.
<crc1> = hi(CRC)
<crc2> = lo(CRC)

Examples of directives used are the following:

Directive A—Assert Control

The Assert Control directive is used for entering the diagnostic-download mode described above. The local unit will only respond if the CRC in the packet is correct.

command: <FF><55><count>A<crc1><crc2>
response: <FF><55><count>A<code><firmware id><crc1><crc2>
where <code> is the result code.

A Code value of <00> means the Onyx has entered the diagnostic mode successfully.

Directive G

This command reads 16 statistical counters in the unit, if present.

command: <FF><55><count>G<crc1><crc2>
response: <FF><55><count>G<16 binary words><crc1><crc2>

This command reads back the 16 diagnostic counters (16 bit words) from the check reader unit.

Directive N

This command puts the unit into download mode. Upon the completion of the download, Onyx automatically exits the diagnostic mode and executes the software downloaded.

command: <FF><55><count>N<crc1><crc2> response: <FF><55><count>N<crc1><crc2>

Directive D

This command dumps a block of memory of the given address and size.

command: <FF><55><count>D0+aaaaaann<crc1><crc2> response: <FF><55><count>D<binary data><crc1><crc2> where aaaaaa specifies the memory address ('000000' to '00FFFF')

nn specifies the number of bytes to get, in hex.

Directive X

This command exits the diagnostic mode, and resumes execution.

command: <FF><55><count>X<crc1><crc2> response: <FF><55><count>X<crc1><crc2>

Directive 1

This command invokes the diagnostic memory stress test. It is a destructive memory test because every byte in the non-volatile memory is written with test patterns repeatedly.

The only method to exit this test is by powering off the unit. During the stress test, the status LEDs will toggle between green and red indicating the reading and writing cycles, respectively.

command: <FF><55><count>1<crc1><crc2> response: <FF><55><count>1<crc1><crc2>

It will be appreciated that this invention can utilize any number of diagnostic or download directives. The invention can be used for initially programming an application into the device or to change or update a program at a later date.

The above description of embodiments of apparatus and methods utilizing the principles of this invention is given by way of example only, not of limitation of the scope of the invention. Persons of skill in this art could make numerous modifications to these examples without departing from the scope of the invention as claimed in the following claims.

What is claimed is:

1. A method for operating a local device to permit a host computer to assert control over the local device via a communication port, comprising the steps of:

a. setting up in the local device a control available time window of prearranged duration in response to a power on start condition;

b. receiving during said control available time window an Assert Control signal from said host computer:

c. transmitting an Acknowledge Control signal to said host computer upon receipt of said Assert Control signal during said control available time window;

d. responding to any control commands and data received from said host computer after sending of said Acknowledge Control signal; and e. initiating processing of a normal local device application process when no Assert Control signal is received during said control available time window or after said host computer has finished sending control commands and data to said local unit.

2. The method of claim 1, wherein said Assert Control signal comprises a prearranged number of characters in a prearranged sequence said step b. comprises:

b.1. receiving during said control available time window a prearranged number of characters from the host computer via the communication port;

b.2. checking said characters to determine if said characters comprise a prearranged Assert Control character sequence;

and said step c. comprises transmitting an Acknowledge Control message when said characters comprise said Assert Control character sequence.

3. The method of claim 1, wherein said Assert Control signal comprises a prearranged first two characters of a multicharacter data packet, said step b. comprises:

b.1. receiving during said control available time window a character from said communication port;

b.2. checking said character to determine if it is the first of said two prearranged characters;

b.3. if step b.2. is not satisfied, repeating step b.1.; and b.4. if step b.2. is satisfied, b.4.a. receiving during said control available time window another character to determine if it is the second of said two prearranged characters; and b.4.b. if step b.4.a. is not satisfied, going to step e, b.4.c. if step b.4.a. is satisfied, b.4.c.1. receiving the remaining characters in said multicharacter data packet;

b.4.c.2. checking said data packet to determine if it is valid; and b.4.c.3. if step b.4.c.2 is not satisfied, going to step e;

b.4.c.4. if step b.4.c.2 is satisfied, going to step c.

4. A system for temporarily controlling a local device from a host computer via a data communication channel between a port on the host computer and a port on the local device, said host computer including sending means for repeatedly sending over said data communication channel to said local device a prearranged Assert Control message;

detecting means active after sending each of said Assert Control messages for detecting a prearranged Acknowledge Control message from said local device; and control means active upon receipt of said Acknowledge Control message from said local device to send prearranged control and data signals to said local device;

said local device including window setting means responding to the establishing of a Power On condition for setting a Control Window period of a prearranged duration;

control detecting means exclusively active during said Control Window period for receiving and verifying an Assert Control message from said host computer;

control acknowledging means responsive to said control detecting means to send an Acknowledge Control message to said host computer via said data communication channel;

control response means for responding to control signals from said host computer after said Acknowledge Control message has been sent; and application starting means responsive to expiration of said Control Window period to initiate normal application operation of said local device.

5. The system of claim 4, wherein said Assert Control message comprises prearranged first and second characters of a multicharacter data packet;

said control detecting means in said local device comprises first character means active during said Control Window period for receiving individual characters in sequence and for verifying whether any of said individual characters is said prearranged first character;

second character means active during said Control Window period and responsive to said first character means finding said prearranged first character for receiving the next character and determining whether said next character is said prearranged second character; and packet verify means responsive to said second character means verifying said prearranged second character for receiving the remaining characters in said data packet and verifying if said data packet is valid.

6. The system of claim 5, wherein said application starting means is responsive to said second character means to initiate normal application operation of said local device when said next character is not said prearranged second character and said application starting means is responsive to said packet verify means to initiate normal application operation of said local device when said received data packet is not valid.

7. A system for enabling a host computer to assert temporary control over a local device, each of said host computer and said local device including a central processing unit, program control means, and a data communication interface to a data communication channel, said program control means in said host computer including:

means for repeatedly sending over said data communication channel a prearranged Assert Control message, and means responsive to receipt of a prearranged Acknowledge Control message over said data communication channel for sending preprogrammed control and data signals to said local device;

said program control means in said local device including:

means for setting a control available time window of prearranged duration in response to a power on start condition, means active during said control available time window for receiving said prearranged Assert Control message over said data communication channel, means responsive to receipt of said prearranged Assert Control message for sending a prearranged Acknowledge Control signal over said data communication channel;

means active after receipt of said prearranged Assert Control message for receiving and responding to said preprogrammed control and data signals from said host computer; and means for initiating normal local device application processing activity when no Assert Control signal is received during said control available time window and after receiving and responding to said preprogrammed control and data signals from said host computer when said Assert Control signal is received during said control available time window.

* * * * *